United States Patent

Vidal

[15] 3,686,873

[45] Aug. 29, 1972

[54] CONSTRUCTIONAL WORKS

[72] Inventor: Henri C. Vidal, 17, rue Armengaud, 92 Saint-Cloud, France

[22] Filed: May 25, 1970

[21] Appl. No.: 39,956

Related U.S. Application Data

[60] Continuation-in-part of Ser. No. 810,883, Jan. 10, 1969, abandoned, which is a division of Ser. No. 354,947, March 26, 1964, Pat. No. 3,421,326.

[30] Foreign Application Priority Data

Aug. 14, 1969 France......................6927983

[52] U.S. Cl..........................................61/39, 61/49
[51] Int. Cl. .............................................E02d 5/20
[58] Field of Search ....61/39, 35, 34, 30, 49; 52/585, 52/589, 590

[56] References Cited

UNITED STATES PATENTS

| 1,762,343 | 6/1930 | Munster | 61/39 |
| 1,806,255 | 5/1931 | Groner et al. | 61/30 |
| 776,799 | 12/1904 | Reed | 61/30 |
| 1,829,864 | 11/1931 | Kidd | 61/30 |
| 1,885,470 | 11/1932 | Noetzli | 61/30 |
| 2,405,289 | 8/1946 | Cardwell | 61/39 |
| 2,879,647 | 3/1959 | Hayden | 61/39 X |
| 3,282,054 | 11/1966 | Saginor | 61/39 X |
| 3,342,033 | 9/1967 | Crouch et al. | 61/30 |
| 3,421,326 | 1/1969 | Vidal | 61/39 |

FOREIGN PATENTS OR APPLICATIONS

1,165,317  5/1958  France..........................61/39

Primary Examiner—David J. Williamowsky
Assistant Examiner—Philip C. Kannan
Attorney—Burns, Doane, Swecker & Mathis

[57] ABSTRACT

Cladding for the outer surface of a reinforced earth structure comprising reinforcements embedded in a mass of particles. The cladding comprises cladding elements having a generally plane configuration which are so adapted and arranged in adjacent relation to each other that the cladding is capable of deforming in directions parallel to the planes of the cladding elements. Methods of connecting the cladding elements to the reinforcements to form a combined cladding and reinforced earth structure are also described.

25 Claims, 36 Drawing Figures

PATENTED AUG 29 1972

CONSTRUCTIONAL WORKS

This is a continuation-in-part of my U.S. Pat. application Ser. No. 810,883, filed Jan. 10, 1969, now abandoned, which was a Divisional application based on U.S. Pat. application Ser. No. 354,947 filed Mar. 26, 1964 which matured to U.S. Pat. No. 3,421,326.

The present invention relates to the construction of the skin or cladding for reinforced earth structures.

The characteristics, the methods of calculating and the application of reinforced earth have been explained in said U.S. Pat. No. 3,421,326. It will be recalled that reinforced earth is of more particular utility in the construction of retaining walls, embankment or wharf walls, platforms for highways, arch dams, arches and tunnels, foundations, pillars, beams, etc.

In its typical construction, a reinforced earth structure comprises a mass of particles normally extracted from the natural ground and reinforcements embedded in the mass in which, owing to frictional contact with the grains or particles, the reinforcements ensure that the structure is stable, the free surface of the structure being cladded with non-rigid cladding or skin for retaining the particles which are located in the vicinity of the free surface and are consequently less responsive to the frictional retaining effect of the reinforcements.

In present-day reinforced earth structures, the cladding most often consists of U-section elements in superimposed relation, the adjacent flanges of the elements being in contact. Although experience has revealed the utility of such elements, the object of the present invention is to provide more particularly cladding elements in the form of a plate or slab, the underlying principle of which is disclosed in said U.S. Pat. application Ser. No. 810,883.

The slab-type cladding elements according to the invention can comprise a thin wall having edge portions which are in overlapping relation to each other in the manner of fish scales so that the elements possess a certain amount of freedom of relative movement.

Another object of the invention is to provide a cladding wherein slab-like cladding elements produce in the cladding a mosaic effect owing to the fact that at least a number of the cladding elements are secured to ends of reinforcements and that joints are formed between the edges of adjacent slabs, said joints comprising means for sealing off the particles and being so arranged that the elements are relatively movable so that the cladding has a certain flexibility.

The sealing means can be afforded by a suitable shape of the adjacent edge portions of the slabs. They can also comprise bands or section members which are either disposed directly in the thickness of the joints or inserted in recesses or rabbets in the slabs.

The form given to the cladding elements according to the invention has the advantage of resulting in lighter structures and easier handling. Moreover, the elements can be constructed on the site from concrete or reinforced concrete which, in some cases, may result in a cheaper construction.

It may be added that, in the absence of a predominent dimension, the elements lend themselves better to the cladding of a complex surface, for example a surface having a multiple curvature. The elements according to the invention can produce architectural effects owing to their construction in the style of a mosaic.

Further features and advantages of the invention will be apparent from the ensuing description with reference to the accompanying drawings.

Figure 1:
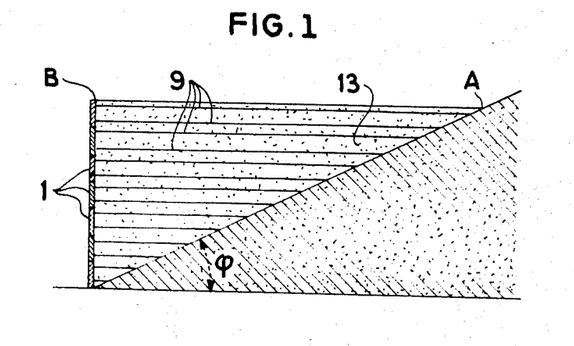
FIG. 1 is a diagrammatic sectional view of a wall of reinforced earth whose outer surface is cladded by elements in the form of plates or slabs.

FIG. 1 shows, as an example of a reinforced earth structure, a retaining wall having the sectional shape of a right-angled triangle which bears on a bank A whose slope has an angle for example equal to the angle $\phi$ of a natural heap. This wall comprises a mass of earth whose stability is ensured by the frictional contact of the grains 13 of the mass with reinforcements 9 disposed in horizontal evenly spaced layers whose ends adjacent the bank A are free. The grains or particles adjacent the vertical surface defining the structure on the side thereof opposed to the bank A are retained by a cladding or skin B comprising cladding elements 1 in the form of plates or slabs.

Figure 2:
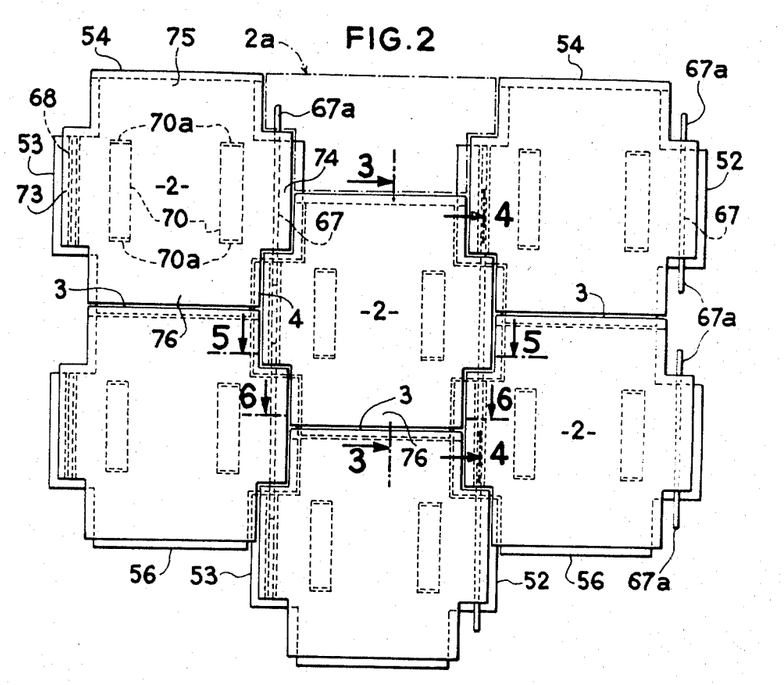
FIG. 2 is a front elevational view of the cladding of the structure shown in FIG. 1, comprising concrete elements in the form of cruciform slabs giving the cladding the appearance of a mosaic having discontinuous joints.

As can be seen in FIG. 2, the cladding B is constructed from cross-shaped slabs or plates 2 arranged in such manner as to form horizontal joints 3 and vertical joints 4.

The vertical edge portions of the horizontal branches 73, 74 of the cross configuration have a length which is roughly equal to the sum of the lengths of the vertical branches 75, 76 so as to allow the slabs to exactly interengage and form a surface having the appearance of a mosaic whose joints have a roughly constant width.

Figure 5:
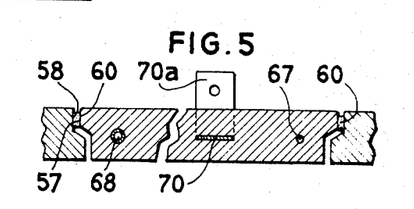
Figure 6:
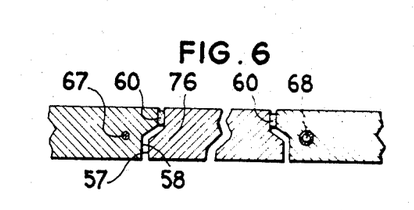

The respective vertical edge portions 52, 53 of a slab 2 have a Z-shaped cross section which defines in each edge portion of the slab a tongue 57 which engages a rabbet 58 in the edge portion of the adjacent slab and defines a joint 4 also having a Z-shaped cross section (FIGS. 5 and 6).

Figure 3:
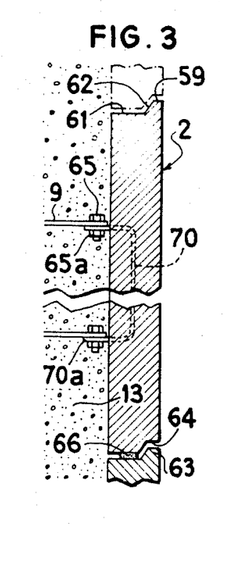
FIGS. 3, 4, 5 and 6 are sectional views taken along lines 3—3, 4—4, 5—5 and 6—6 of FIG. 2.
Figure 4:
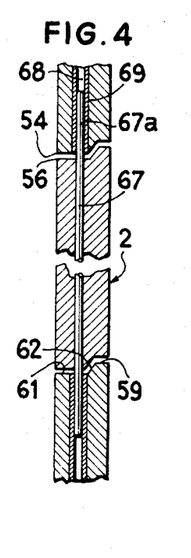

The horizontal edge portions 54, 55 also have a Z-shaped cross section which defines two plane vertically offset horizontal faces 59, 61, the face 59 being narrow and adjacent the outer surface whereas the face 61 is a wide and located adjacent the mass 13 and constitutes a supporting face or course, the two faces being interconnected by an oblique plane face 62 (FIGS. 3 and 4). This arrangement affords in the upper edge portion 64 a tongue 63 which engages a rabbet 64 in the lower horizontal edge portion 56 of the adjacent slab and forms for the joint 3 an opening whose dimension is defined by the thickness of a band 66 of relatively flexible or pliant material — such as the product commercially known under the name of FLEXCELL comprising vegetables fibers agglomerated by a bituminous product — interposed between the two faces 61 of the adjacent edge portions 54,56, at least at the end of the vertical branches 75, 76.

A positive connection between the adjacent horizontal edge portions is ensured by means of vertical pins 67 which are embedded in the thickness of the right horizontal branch 64 of each slab in the region of the face 61 and extend beyond the upper and lower edge portions of this branch. Each projecting portion 67a of the pins 67 is engaged with clearance in a cylindrical aperture 68 which extends through the horizontal left branch 63 of the adjacent slab. Each aperture 68 is advantageously provided with a tubular sleeve 69 of metal or plastics material.

The assembled slabs are relatively movable in the plane of the free surface of the reinforced earth structure owing to the provision of clearance in the vertical joints 4, the clearance between the pins 67 and the receiving apertures 68 and the compressibility of the band 66.

Figure 7:
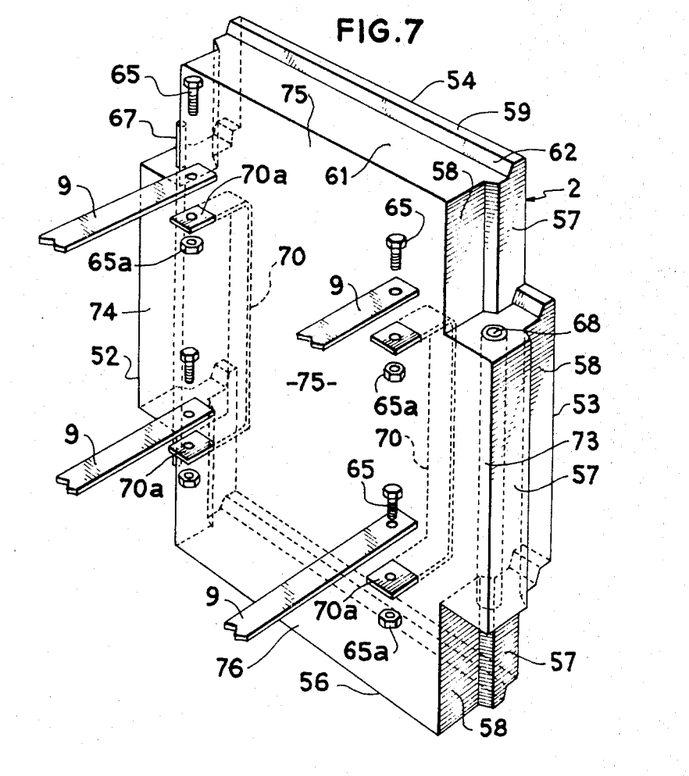
FIG. 7 is a perspective view of the assembly of metal reinforcements with a slab employed in the cladding shown in FIG. 1.

Each slab 2 is connected to four metal reinforcements 9 each of which is assembled by the tightening of a nut 65a on a bolt 65 which extends through an aperture at the end of the reinforcement and an aperture in a lug 70a which extends from the rear face of the slab and constitutes one of the branches of one of two fork members 70 embedded in the thickness of the slab (FIG. 7).

When the grains or particles 13 of the mass are relatively fine it might be desirable to insert in the vertical joints 4 sealing bands 60 of a very flexible or pliant material, as a foam polyurethane.

It will be understood that in order that the cladding be continuous throughout its height it is necessary to provide at the upper ends and lower ends of the cladding wall B half-slabs 2a which fill the relative offset of the slabs in the immediately adjacent rows of slabs.

Figure 8:
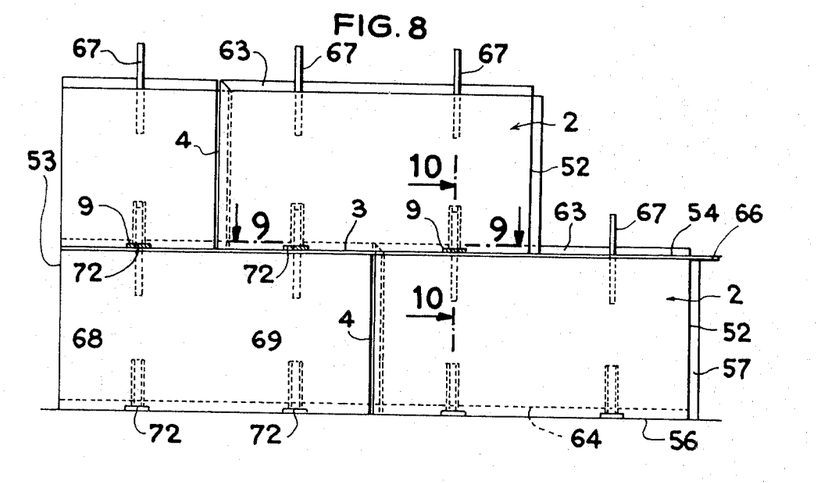
FIG. 8 is a rear view of a cladding comprising slabs assembled by means of pins as in the embodiment shown in FIG. 1.
Figure 9:
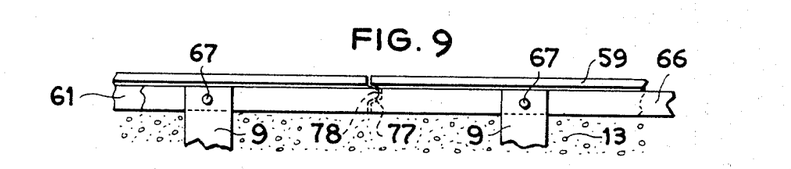
FIGS. 9 and 10 are sectional views taken along lines 9—9 and 10—10 of FIG. 8.
Figure 10:
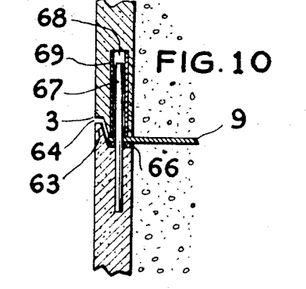
Figure 11:
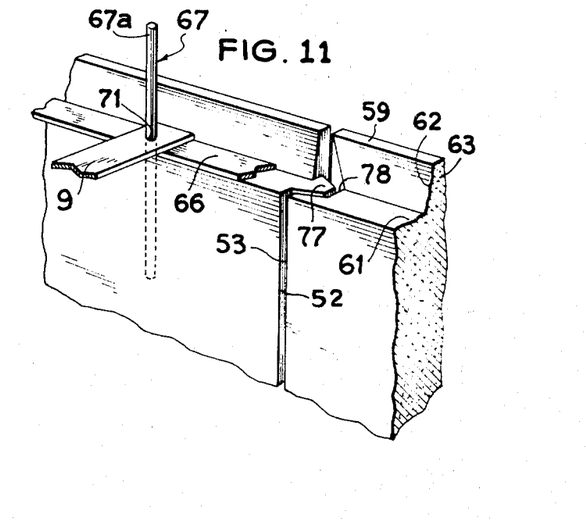
FIG. 11 is a perspective view of the connection between a reinforcement and a slab of the cladding shown in FIG. 8.

FIG. 8 shows the rear face of a cladding or skin of a reinforced earth structure in which the assembled component slabs 2 are rectangular, there being continuous horizontal joints 3 and offset vertical joints 4.

The respective vertical edge portions 52, 53 of the slab 2 shown in FIG. 8 comprise a tongue 77 having a trapezoidal cross-sectional shape and a groove 78 which has a complementary trapezoidal cross-sectional shape and accommodates the tongue 77 of an adjacent slab with clearance and contributes to the assembly of two slabs.

The general arrangement of the horizontal edge portions 54, 56 is the same as in the embodiment shown in FIGS. 2–4 and the assembly of two adjacent horizontal edge portions is completed by pins 67 which are embedded to a depth equal to their length in the thickness of each slab in the region of the upper face or course 61. The projecting portions 67a of the pins 67 extend through the pliant band 66 and are engaged with clearance in blind cylindrical apertures 68 which open onto the lower face 61 of the lower edge portion 56 of an adjacent slab. Each aperture 67 is advantageously provided with a tubular sleeve 69 of metal or plastics material. The slabs or plates 2 are connected to the reinforcements 9 by fitting the pins 67 in apertures 71 provided at the ends of the reinforcements 9 and disposing these reinforcements in contact with the top face of the flexible bands 66 inserted between the faces 61.

The thickness of the reinforcements 9 is accommodated by rectangular recesses 72 formed in the faces 61 of the lower edge portions 66, clearance being arranged between the recesses and the reinforcements.

In the illustrated embodiment, each slab 2 has in the upper edge portion 54 two pins 67 and in the lower edge portion 66 two cylindrical apertures 68, said pins and apertures being symmetrically arranged in such spaced relation that it is possible to insert the neighboring pins of two adjoining slabs in a given horizontal row in the receiving apertures of a single slab of the immediately upper horizontal row and thereby achieve vertical laterally offset joints as illustrated, or alternatively, to insert both pins of a given slab in both apertures of another slab in the row immediately above and thus achieve continuous vertical joints.

Figure 12:
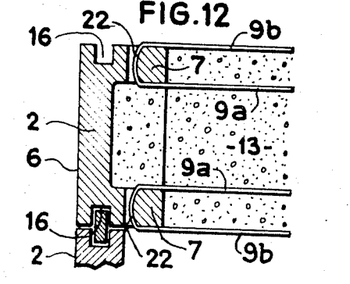
FIGS. 12 and 13 are vertical sectional views of different embodiments of connections between reinforcements and elements having a form different from the elements shown in FIGS. 1 and 7.

In the embodiment shown in FIG. 12, the slab 2 instead of having two parallel plane outer and inner faces, has an outer or front face 6 which is plane and an inner or rear face in the shape of a dish. Each reinforcement 9 has two portions 9a, 9b obtained by passing the reinforcement through curved slots 22 formed in the side walls 7 of the dish-shaped rear face. These side walls comprise externally a groove 16 in which can be inserted a band 14 having a rectangular cross-sectional shape and also engaged in the groove 16 of an adjacent slab so as to achieve the fluidtight assembly of two slabs.

Figure 13:
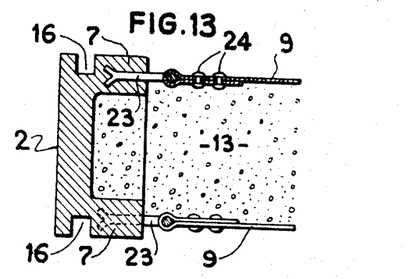

The slab 2 shown in FIG. 13 is secured to the ends of the reinforcements 9 by means of rings 23 anchored in the concrete of the side walls 7, the end portion of each reinforcement 9 being passed through the rings and folded onto itself and fixed by means of clamping members or rivets 24.

Figure 14:
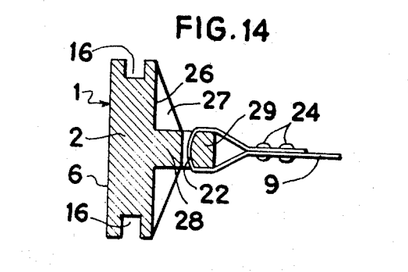
FIG. 14 is a sectional view of a rectangular element whose center is hooked to a reinforcement.
Figure 15:
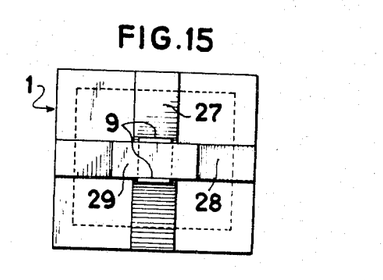
FIG. 15 is an elevational view of the element shown in FIG. 14.

The slab 2 shown in FIGS. 14 and 15 has a plane outer face 6 and, disposed on its inner face 26, perpendicular ribs 27, 28 whose junction carries a projecting portion 29 in which is formed as shown in FIG. 12 a curved slot 22. A single reinforcement 9 extends through the latter, the reinforcement being bent onto itself, the bent portion being fixed by rivets 24.

FIGS. 16–24 show various embodiments of sealing means for the joint 3 or 4 between the adjacent edge portions of the slabs.

Figure 16:
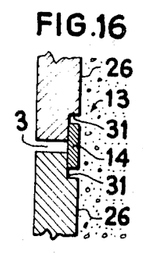
FIGS. 16–18 are sectional views of three embodiments of sealing means which comprise a joint cover in the form of a flat band.

In FIG. 16, the sealing band 14, for example of plastics material, is inserted in the rabbets 31 formed on the inner faces 26 of the slabs 2 which have a plane shape without a flange. The thrust of the grains or particles of earth 13 tend to apply the band 14 against the vertical face of the rabbets 31.

Figure 17:
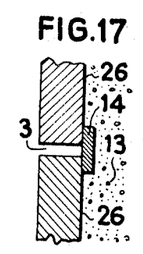

In FIG. 17, the sealing band 14 is merely applied against the inner plane face 26 of the slabs 2.

Figure 18:
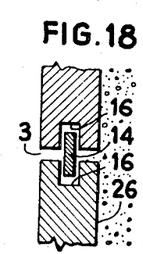

The arrangement shown in FIG. 18 is similar to that shown in FIG. 12 except that the slabs 2 have two plane faces.

In this embodiment, as in FIG. 12, a clearance is provided between the bands 14 and the rabbets which receive them so that the elements 1 are relatively movable and that the cladding, as a whole, is non-rigid and therefore satisfies the condition assigned to its function in the reinforced earth structure.

Figure 19:
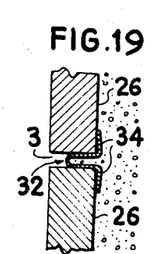
FIG. 19 is a sectional view of a joint cover comprising an elastic section member inserted between two edges of adjacent slabs.
Figure 20:
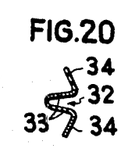
FIG. 20 is a sectional view of the section member shown in FIG. 19 in the free state.

In FIG. 19, a section member 32, for example of metal or plastics material, is employed as a sealing element. For this purpose, the section member 32 has two branches 33 arranged in a V configuration and extended by oblique flanges 34. The V-shaped portion 33 can be inserted in the joint 3 and this pinches the branches and produces a clamping effect in contact with the edge portions 36 of the slabs 2 and a flattening of the flanges 34 in contact with the inner faces 26.

Figure 21:
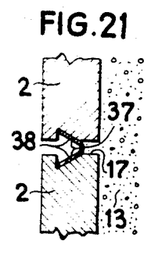
FIG. 21 is a sectional view of a sealing section member having a wedged-shaped cross section.

FIG. 21 shows grooves 37 having a wedged-shaped cross section formed in the edge portion 17 of the adjacent slabs 2. These grooves receive the branches 38 of a V-section element whose point points inwardly so that the earth 13 tends to lock the sectional element in position by the contact of the ends of its branches against the vertical flank of the grooves 37.

Figure 22:
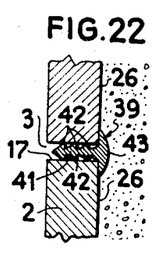
FIG. 22 is a sectional view of a joint cover inserted between the adjacent edges of two slabs and including a head portion in abutting relation to the slabs.

In FIG. 22, the joint 3 is closed by the insertion therein of a section member 39 of a plastics material comprising a strip portion 41 which is introduced in the joint 3 and provided with oblique lip portions 42 which, owing to wedging upon contact with the edges 17, retains the section member inwardly of the cladding. The section member 39 is retained in the outward direction by a head 43 which bears against the inner face 26 of the slabs 2.

Figure 23:
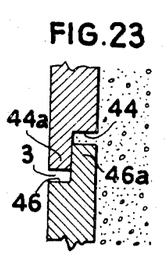
FIG. 23 is a sectional view of two adjacent slabs having tongues disposed in overlapping relation and constituting a half-lap joint.

In FIG. 23, two rabbets 44, 46 which are axially offset are formed in the edge portions of adjacent slabs 2 so that the tongues 44a, 46a formed by the rabbets can be dispose in overlapping relation and form a half-lap assembly, the contact of the vertical faces of the rabbets sealing the joint 3.

Figure 24:
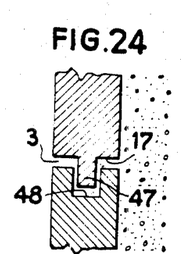
FIG. 24 is a sectional view of a tongue-and-groove assembly.

In FIG. 24, one of the edge portions 17 has a tongue 47 which is engaged in a groove 48 in the opposite edge portion and closes the joint 3.

Figure 25:
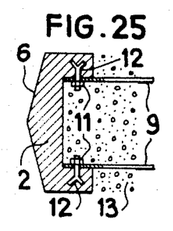
FIGS. 25-28 are diagrammatic sectional views of modifications in the form of the outer face of cladding slabs made from heavy material such as concrete.

The slab 2 shown in FIG. 25 has an inner face in the form of a dish and the side walls 7 of this dished face are provided with studs 12 anchored in the concrete for fixing reinforcements 9 by means of nuts 11 screwed on the studs 12. The outer face 6 has a projecting V-shape or a shape in the form of a diamond point.

Figure 26:
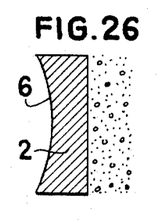
Figure 27:
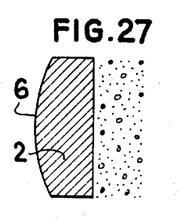

In FIG. 26, the outer face has a concave shape whereas in FIG. 27 this shape is convex.

Figure 28:
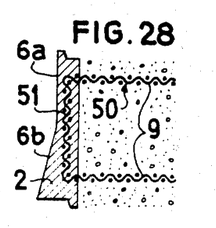

The outer face of the slab 2 shown in FIG. 28 has an upper part 6a parallel to the inner face and a lower part 6b also plane but inclined so that the slab thickens in the downward direction. Further, each reinforcement 9 constitutes one of the portions of a band 50 of textile material, for example of Tergal (polyester fibers), which is folded and embedded at 51 in the thickness of the slab.

Figure 29:
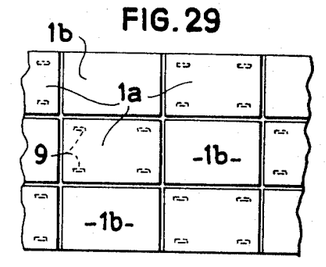
FIG. 29 is a diagrammatic front elevational view of a cladding including rectangular elements or slabs, which slabs connected to reinforcements alternate with slabs having no direct connection to the reinforcements.

Whereas in the foregoing embodiments each slab is connected to the reinforcements 9, for example by a bolting, FIG. 29 shows an arrangement in which each horizontal row of cladding elements 1a fixed to the end of four reinforcements 9 alternate with cladding elements 1b which are completely free of reinforcements, the elements 1b being retained by the assembly of their edge portions with the adjacent edge portions of elements 1a through a positive connection such as those shown in FIGS. 2, 8, 18, 23, 24.

Figure 30:
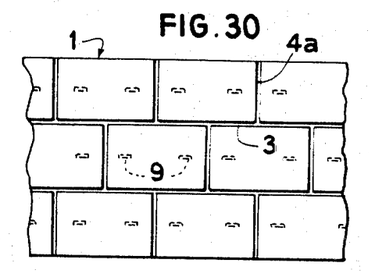
FIG. 30 is a front elevational view of an arrangement of rectangular slabs forming offset vertical joints.

FIG. 30 shows the skin or cladding with continuous horizontal joints 3 and offset vertical joints 4a. By way of example, each cladding element 1 has been shown to be connected to two reinforcements 9.

Figure 31:
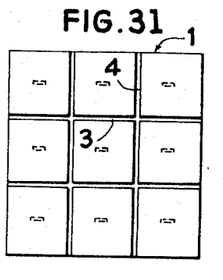
FIG. 31 is a front elevational view of a cladding comprising square elements.

The arrangement shown in FIG. 31 corresponds to a mosaic arrangement having a continuous joint as in the embodiment shown in FIG. 1 in which the plates or slabs have a square shape, each plate or slab being connected to a single reinforcement as in the embodiments shown in FIGS. 14 and 15.

Figure 32:
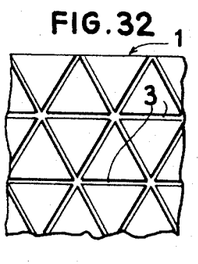
FIG. 32 is a front elevational view of triangular cladding elements.

In FIG. 32, the mosaic arrangement is achieved by means of cladding elements 1 having the shape of an equilateral triangle, each triangle having a horizontal side adjacent a continuous horizontal joint 3.

Figure 33:
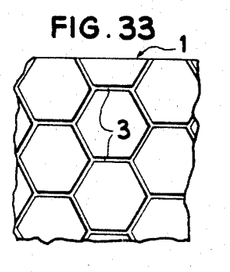
FIG. 33 is a front elevational view of hexagonal cladding elements.
Figure 34:
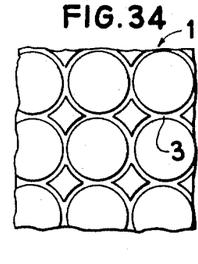
FIG. 34 is a front elevational view of a cladding comprising circular cladding elements combined with curvilinear diamond-shaped cladding elements.

FIG. 33 shows cladding elements having a hexagonal shape, whereas the mosaic arrangement shown in FIG. 31 results from the combination of circular cladding elements and cladding elements in the shape of a curvilinear diamond inserted in the free spaces between the circular elements, the elements being aligned in the horizontal and vertical direction.

Figure 35:
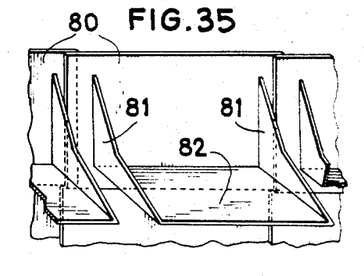
FIG. 35 is a perspective view of cladding elements consisting of thin plates disposed in the manner of fish scales.

FIG. 35 shows a cladding or skin of a reinforced earth structure constituted in the manner of fish scales, this cladding comprising thin rigid plates which may be plane or curved, assembled in overlapping relation and adapted to be anchored in the grains or particles of the structure. The plates 80 are square or rectangular and provided with two ribs 81 interconnected by a web 82. Reinforcements 9 composed of flat bands are disposed between the ribs 81 and are parallel to the web 82.

Figure 36:
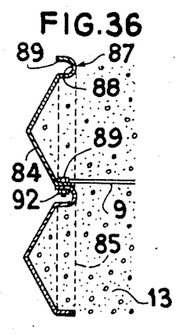
FIG. 36 is a view of another cladding element.

The cladding or skin shown in FIG. 36 also comprises thin rigid plates of metal or plastics material. The plates 84 have the shape of a V or diamond point and a peripheral flange 85. The latter comprises, in the lower part, a simple plane flange portion 86 and, in the upper part, a groove portion 87 whose inner portion 88 is preferably elliptical. The upper wall 89 of the groove portion 87 is connected by a bolt 91 and a nut 92 to the plane flange portion 86 of the adjacent plate 85 and to the end of a reinforcement 9. The required flexibility of the cladding or skin is achieved by the ability of the groove portion 87 to deform, the flange portions of the groove portion being free to move toward or away from one another.

Having now described my invention what I claim and desire to secure by Letters Patent is:

1. A cladding consisting of a mosaic arrangement of adjacent cladding elements in the form of a plate or slab for cladding a free surface of a mass of particles of a reinforced earth structure comprising flexible reinforcement members each of which reinforcement members extends from said surface into said mass of particles and is in contact with adjoining particles of said particles and in spaced and separate relation to the other members, said members and said adjoining particles being maintained in relative position in said mass solely by the effect of friction between said adjoining particles and said reinforcement members, means for fixing at least some of said cladding elements to ends of said reinforcement members, said slabs having edge portions which define with edge portions of adjacent slabs joints adapted and arranged to allow a relative displacement between adjacent slabs, and means defining a seal for preventing said particles from passing between adjacent slabs.

2. The cladding of claim 1, wherein the slabs comprise in an edge portion thereof at least one pin extending out of the slab and in an opposite edge portion of the slab at least one aperture in which a pin of an adjacent slab is engaged for assembling two adjacent slabs.

3. The cladding of claim 1, wherein the slabs have a shape in the form of a cross, each slab having a branch portion and at least one pin extending out of said branch portion and an opposite branch portion and for example at least one aperture in which is engaged a pin of an adjacent slab for assembling two adjacent slabs.

4. The cladding of claim 2, wherein said pin extends through an end of a reinforcement inserted in the corresponding joint between adjacent slabs.

5. The cladding of claim 4, wherein the end of the reinforcement is disposed in a recess in one of the adjacent edge portions of assembled adjacent slabs.

6. The cladding of claim 1, wherein the slabs have the shape of a dish having side walls which can be fixed to the reinforcements.

7. The cladding of claim 1, wherein said fixing means are rings embedded in the slabs.

8. The cladding of claim 1, wherein said sealing means comprise joint covers.

9. The cladding of claim 8, wherein said joint covers are section members.

10. The cladding of claim 8, wherein said joint covers comprise section members having a portion inserted in the corresponding joint in contact with edges of adjacent slabs and another portion in abutting relation with inner faces of the adjacent slabs and thus retaining the section member.

11. The cladding of claim 1, wherein at least one of the adjacent edge portions of two adjacent slabs comprises a tongue inserted in a recess of the corresponding edge portion of the adjacent slab.

12. The cladding of claim 1, comprising a band of flexible material disposed flat in horizontal joints between adjacent slabs.

13. The cladding of claim 12, wherein assembly pins engaged in adjacent slabs extend through the band.

14. The cladding of claim 1, wherein each cladding element is fixed to at least one reinforcement.

15. The cladding of claim 1, wherein said cladding elements have a polygonal shape.

16. The cladding of claim 1, wherein the slabs have a plane outer face.

17. The cladding of claim 1, wherein ends of the reinforcements are embedded in the material of the slabs.

18. The cladding of claim 1, comprising at least one fork member embedded in each slab, said fork member having branches which extend out of the slab on a face thereof adjacent said mass for fixing the reinforcements thereto.

19. The cladding of claim 1, comprising sealing elements of flexible material inserted in vertical joints between the adjacent cladding elements.

20. Constructional work comprising an assemblage of first elements and second elements, the first elements being particles constituting a mass of particles having an outer surface and the second elements being flexible reinforcement elements each of which reinforcement element extends from adjacent said outer surface inwardly of said mass and is in spaced and separate relation to the other reinforcement elements, said reinforcement elements and said adjoining particles being maintained in relative position in said mass solely by the effect of friction between said adjoining particles and said reinforcement elements, and cladding disposed on said outer surface of said mass for preventing the particles adjacent the cladding from falling away, the cladding consisting of substantially plane cladding elements arranged in adjacent relation to one another to form a mosaic arrangement of said cladding elements and constitute a continuous cladding structure capable of retaining said adjacent particles, means for anchoring said substantially plane cladding elements in the mass of particles, and means associated with edge portions of said cladding elements which are so adapted and arranged as to allow a relative displacement between adjacent slabs so that said cladding structure is capable of being deformed in a direction parallel to the planes of said cladding elements and said reinforcements having ends remote from said outer surface which are freely disposed in said mass.

21. Constructional work as claimed in claim 20, wherein said substantially plane cladding elements have marginal portions in overlapping relation to marginal portions on adjacent substantially plane cladding elements.

22. Constructional work as claimed in claim 20, wherein said cladding elements are arranged in overlapping relation to one another, and said anchoring means including means connecting said substantially plane cladding elements to said reinforcements.

23. The cladding of claim 1 wherein a band of textile material comprises two vertically spaced main portions providing said reinforcement members and an intermediate portion extending at right angles from said main portions and embedded in the thickness of the slab.

24. The cladding of claim 1 wherein the slabs are of concrete.

25. The cladding of claim 1 wherein said seal means includes sealing elements of flexible material inserted in horizontal joints between the adjacent cladding elements.

* * * * *